(12) United States Patent
South et al.

(10) Patent No.: US 12,460,760 B2
(45) Date of Patent: Nov. 4, 2025

(54) ATTACHMENT FOR FLUID CHARACTERISTIC MEASUREMENT SENSOR

(71) Applicant: THE YOKOHAMA RUBBER CO., LTD., Tokyo (JP)

(72) Inventors: Luke South, Versailles, KY (US); Ibuki Sato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 357 days.

(21) Appl. No.: 18/084,919

(22) Filed: Dec. 20, 2022

(65) Prior Publication Data

US 2024/0200706 A1 Jun. 20, 2024

(51) Int. Cl.
*F16L 41/00* (2006.01)
*G01L 19/00* (2006.01)

(52) U.S. Cl.
CPC ........ *F16L 41/008* (2013.01); *G01L 19/0007* (2013.01); *G01L 19/0092* (2013.01)

(58) Field of Classification Search
CPC . F16L 41/008; G01L 19/0007; G01L 19/0092
See application file for complete search history.

(56) References Cited

U.S. PATENT DOCUMENTS

| | | | | |
|---|---|---|---|---|
| 4,091,533 | A * | 5/1978 | Saumell | B23D 21/10 30/95 |
| 4,549,349 | A * | 10/1985 | Harrison | B23D 35/00 30/92 |
| 5,082,367 | A * | 1/1992 | Kohler | G01N 21/8507 356/73 |
| 6,581,620 | B2 * | 6/2003 | Babcock | F16L 55/134 137/15.17 |
| 6,708,717 | B1 * | 3/2004 | Coogle | F24F 13/222 134/171 |
| 7,111,519 | B2 * | 9/2006 | Dille | G01F 1/849 73/861.355 |
| 10,982,523 | B1 * | 4/2021 | Hill | F16L 41/00 |
| 11,143,336 | B1 * | 10/2021 | DuPont, Jr. | F16L 21/00 |

(Continued)

FOREIGN PATENT DOCUMENTS

| | | | | |
|---|---|---|---|---|
| JP | 2000104879 | | * 4/2000 | |
| JP | 2000104879 | A | * 4/2000 | ............. F16L 39/00 |
| JP | 2020-008236 | A | 1/2020 | |

OTHER PUBLICATIONS

Machine translation of JP 2000104879 (Year: 2000).*

*Primary Examiner* — David J Bolduc
(74) *Attorney, Agent, or Firm* — Carrier, Shende & Associates P.C.; Fulchand P. Shende; Joseph P. Carrier

(57) ABSTRACT

A metal tube (10) constituting a fluid flow path (12) is cut, and an attachment (14A) for a fluid characteristic measurement sensor is interposed between end portions of the cut metal tubes (10). The attachment (14A) includes a body (16A) through which a body flow path (1606) extends through and to which a temperature sensor (18) and a pressure sensor (20) are attached in advance and a pair of connection members (22) that connect a fluid flow path (12) and the body flow path (1606). Joint fittings (24A) are allowed to be used as a pair of connection members (22). The attachment improves workability 10 when measuring a characteristic of a fluid and reliably reducing a leakage of the fluid.

11 Claims, 11 Drawing Sheets

(56) References Cited

U.S. PATENT DOCUMENTS

| | | | |
|---|---|---|---|
| 11,334,096 B2* | 5/2022 | Su | G05D 7/0635 |
| 2005/0076508 A1* | 4/2005 | Green | B26B 25/00 |
| | | | 30/101 |
| 2005/0103122 A1* | 5/2005 | Dille | G01F 1/849 |
| | | | 73/861.355 |
| 2005/0104373 A1* | 5/2005 | Zarubaiko | F16L 55/07 |
| | | | 285/133.11 |
| 2005/0189762 A1* | 9/2005 | Endres | G01L 19/0007 |
| | | | 374/E1.019 |
| 2007/0145743 A1* | 6/2007 | Greenberger | G02B 6/4459 |
| | | | 285/322 |
| 2008/0115583 A1* | 5/2008 | Hoimyr | G01D 11/245 |
| | | | 73/706 |
| 2008/0271549 A1* | 11/2008 | Endres | F16L 23/006 |
| | | | 374/E1.019 |
| 2010/0115775 A1* | 5/2010 | Scheider | H01R 27/00 |
| | | | 30/92 |
| 2010/0230963 A1* | 9/2010 | Gayer | F16B 2/10 |
| | | | 285/415 |
| 2012/0048038 A1* | 3/2012 | Furlong | G01L 19/0007 |
| | | | 73/866.5 |
| 2012/0133130 A1* | 5/2012 | Ohara | F16L 23/22 |
| | | | 285/368 |
| 2012/0247286 A1* | 10/2012 | Huang | B23D 21/08 |
| | | | 82/60 |
| 2014/0083180 A1* | 3/2014 | Schaefer | G01F 1/684 |
| | | | 73/204.11 |
| 2015/0308592 A1* | 10/2015 | Keller | F16L 19/025 |
| | | | 285/390 |
| 2015/0316190 A1* | 11/2015 | Devani | F17D 5/02 |
| | | | 285/119 |
| 2015/0369481 A1* | 12/2015 | Engelhardt | F16L 9/18 |
| | | | 126/307 R |
| 2016/0084725 A1* | 3/2016 | Hoffman | F16L 23/006 |
| | | | 285/41 |
| 2016/0327416 A1* | 11/2016 | Gagne | G01D 11/245 |
| 2017/0205261 A1* | 7/2017 | Yogo | F02D 41/18 |
| 2018/0259103 A1* | 9/2018 | Ignaczak | F01N 13/1805 |
| 2020/0182478 A1* | 6/2020 | Acosta Herrero | F23N 1/005 |
| 2020/0248851 A1* | 8/2020 | Takimoto | F17D 5/06 |
| 2020/0340836 A1* | 10/2020 | Hollmach | G01F 1/42 |
| 2022/0196453 A1* | 6/2022 | Fredriksson | F16L 23/08 |
| 2022/0268381 A1* | 8/2022 | Howard | F16L 29/02 |
| 2022/0316640 A1* | 10/2022 | Kempf | F16L 23/032 |
| 2023/0003600 A1* | 1/2023 | Ward | G01L 19/003 |

* cited by examiner

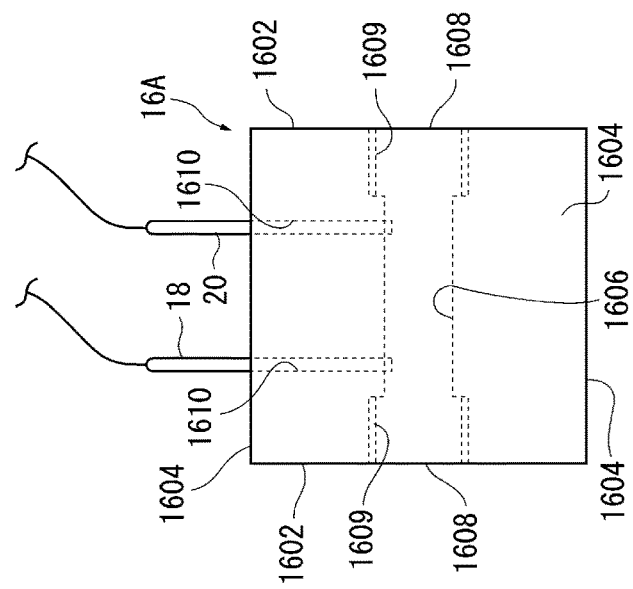
FIG. 2(C)
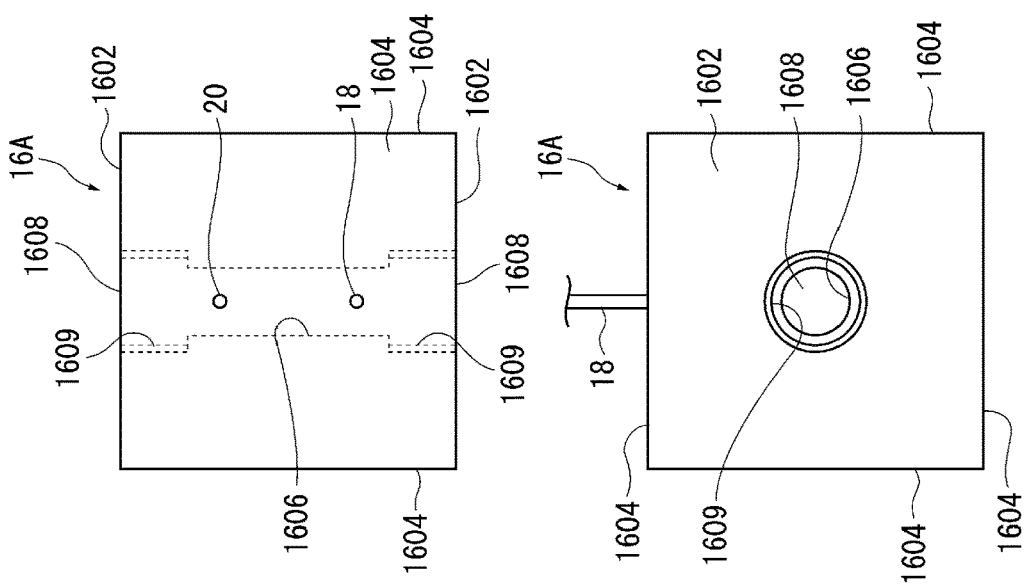
FIG. 2(B)
FIG. 2(A)

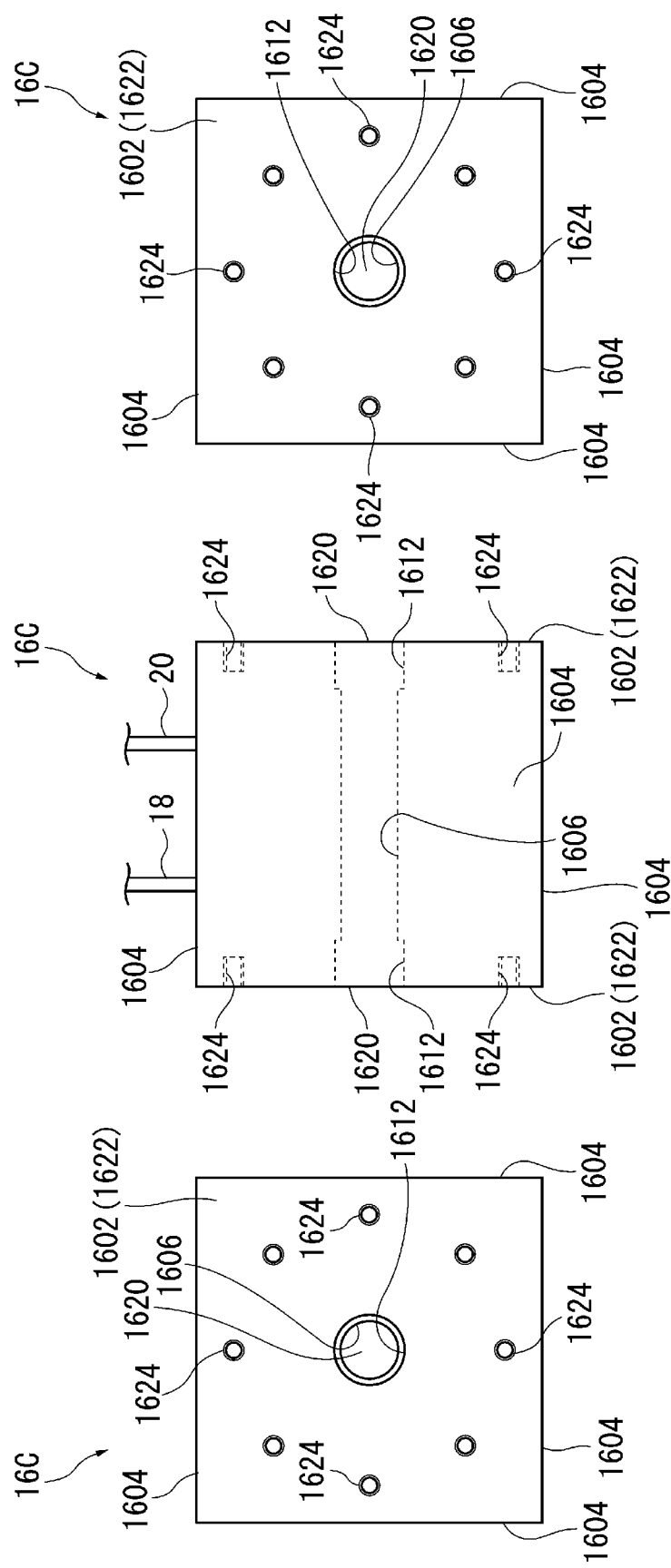

ATTACHMENT FOR FLUID CHARACTERISTIC MEASUREMENT SENSOR

TECHNICAL FIELD

The present invention relates to an attachment for a fluid characteristic measurement sensor for attaching a fluid characteristic measurement sensor to a metal tube.

BACKGROUND ART

A double-pipe heat exchanger that includes a first heat medium flow path and a second heat medium flow path and performs heat exchange with heat media flowing through the flow paths is provided (see Patent Document 1).

To measure characteristics of the double-pipe heat exchanger, it is necessary to detect a temperature and a pressure of the heat medium flowing through each of the first heat medium flow path and the second heat medium flow path.

Specifically, it is necessary to detect the temperatures and the pressures of the heat media at four portions of a close portion of an inlet and a close portion of an outlet of the first heat medium flow path and a close portion of an inlet and a close portion of an outlet of the second heat medium flow path.

Conventionally, a through-hole is provided in each of wall portions of tube bodies forming the first and second heat medium flow paths, a temperature sensor or a pressure sensor is inserted into each of the heat medium flow paths from the outside of the heat exchanger via the through-hole, and a sealant is filled in a gap between each sensor and the through-hole to cover the gap. Thus, the temperature sensor and the pressure sensor are attached to the heat exchanger via an attachment.

CITATION LIST

Patent Literature

Patent Document 1: JP 2020-8236 A

SUMMARY OF INVENTION

Technical Problem

However, in the above-described related art, a preparation work that provides the through-hole in the wall portion of the tube body of the heat exchanger and fills the gap between the through-hole and the temperature sensor or the pressure sensor with the sealant is required, and this preparation work takes, for example, 10 hours or more.

In addition, when a sufficient amount of the sealant is not filled in the gap between the through-hole and the temperature sensor or the pressure sensor, the sealant peels off from the gap due to a pressure of the heat medium and the heat medium leaks, possibly causing an error in a detection value of the temperature sensor or the pressure sensor.

The problem similarly occurs in a heat exchanger other than the double-pipe heat exchanger.

The present invention has been made in view of such circumstances, and an object of the present invention is to provide an attachment for a fluid characteristic measurement sensor that is advantageous in improving workability when measuring a characteristic of a fluid, such as a heat medium, flowing in a heat exchanger and reliably reducing a leakage of the fluid.

Solution to Problem

In order to achieve the object described above, an embodiment of the present invention is an attachment for a fluid characteristic measurement sensor interposed between end portions of cut metal tubes formed by cutting the metal tube constituting a fluid flow path. The attachment includes a body and a pair of connection members. The body has a pair of first opening portions through which a body flow path extends and the body flow path opens. At least one sensor that measures a characteristic of a fluid flowing through the body flow path is attached to the body. The pair of connection members are attached to respective portions of the body where the pair of first opening portions are positioned. The pair of connection members are joined to the end portions of the metal tubes to connect the fluid flow path and the body flow path.

Advantageous Effects of Invention

According to an embodiment of the present invention, the attachment for the fluid characteristic measurement sensor can be interposed into the metal tube by a simple work, and it is advantageous for an efficient measurement work and is advantageous for accurate measurement of characteristics of a fluid, such as a temperature and a pressure of the fluid.

Also, the fluid characteristic measurement sensor is attached to the body in advance, and therefore the fluid does not leak from a portion of the body to which the fluid characteristic measurement sensor is attached, which is advantageous in accurately measuring the characteristics of the fluid.

This eliminates redoing a sample creation work due to measurement error, which is advantageous for an efficient measurement work and is advantageous for shortening the measurement time.

BRIEF DESCRIPTION OF DRAWINGS

FIG. 2(A) to FIG. 2(C) are explanatory diagrams of a body according to the first embodiment. FIG. 2(A) is a front view, FIG. 2(B) is a plan view, and FIG. 2(C) is a side view.

FIG. 4(A) is a front view, FIG. 4(B) is a plan view, FIG. 4(C) is a side view, and FIG. 4(D) is a view in the direction of an arrow D in FIG. 4(C).

FIG. 5(A) is a front view, and FIG. 5(B) is a cross-sectional side view.

FIG. 7(A) to FIG. 7(C) are explanatory diagrams of a body according to the third embodiment. FIG. 7(A) is a front view, FIG. 7(B) is a left side view, and FIG. 7(C) is a right side view.

FIG. 8(A) is a front view, and FIG. 8(B) is a cross-sectional side view.

FIG. 10(A) is a front view, and FIG. 10(B) is a cross-sectional side view.

FIG. 11(A) is a front view, and FIG. 11(B) is a cross-sectional side view.

DESCRIPTION OF EMBODIMENTS

Figure 1:
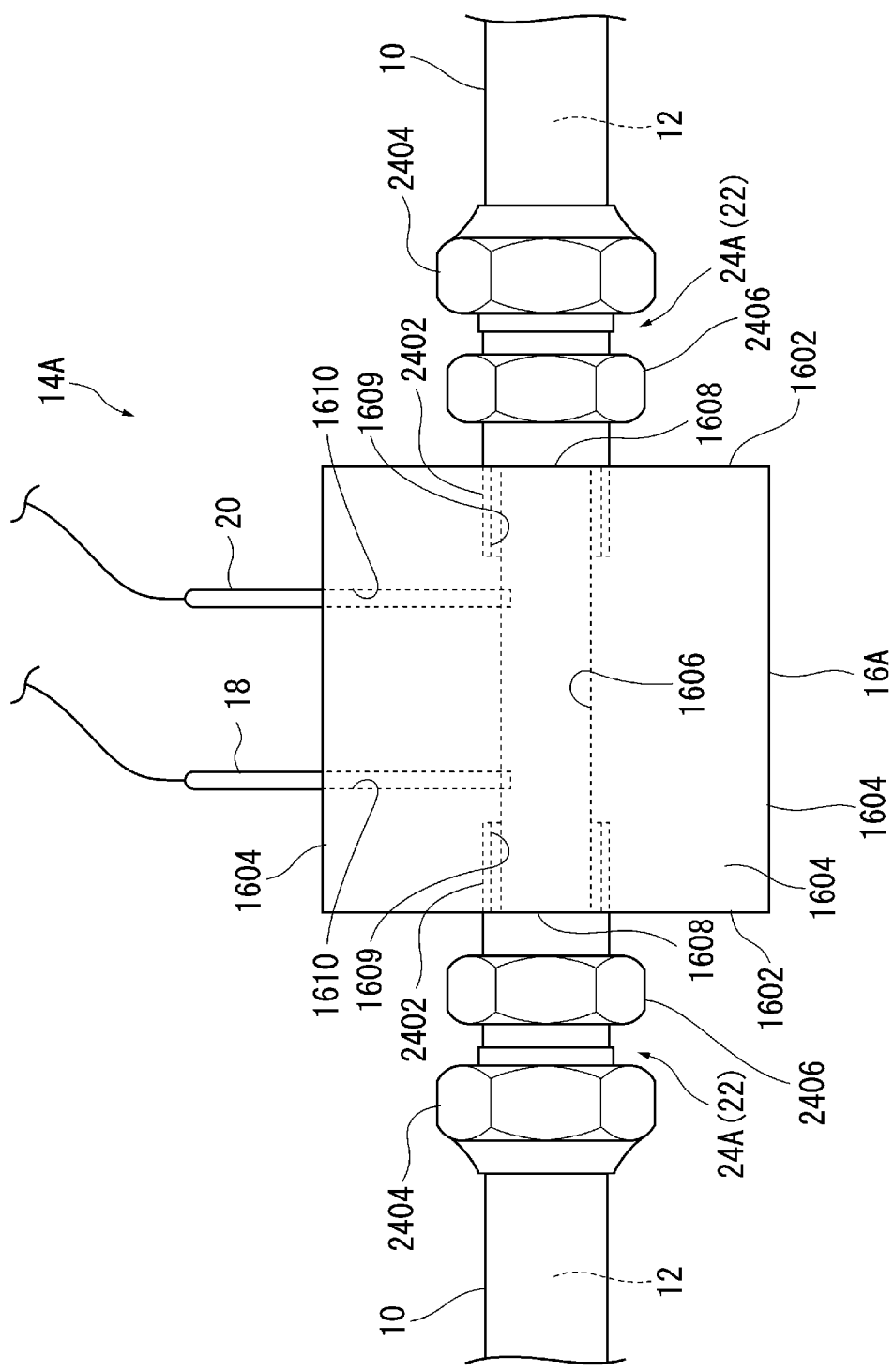
FIG. 1 is a front view of an attachment for a fluid characteristic measurement sensor according to a first embodiment interposed into a metal tube.

Hereinafter, embodiments of the present invention will be described with reference to the examples illustrated in the drawings.

In the present embodiment, an attachment for a fluid characteristic measurement sensor used to detect a temperature and a pressure of a heat medium flowing through each of a first heat medium flow path and a second heat medium flow path to measure characteristics of a double-pipe heat exchanger will be described.

Thus, the fluid characteristic measurement sensors used in the embodiment of the present invention are a temperature sensor that detects the temperature of the heat medium and a pressure sensor that detects the pressure of a fluid.

First Embodiment

First, the first embodiment will be described with reference to FIGS. 1 and 2.

As illustrated in FIG. 1, an inside of a metal tube 10 is a fluid flow path 12 through which a fluid, a heat medium in this embodiment, flows.

The fluid flow path 12 of the metal tube 10 is a first heat medium flow path or a second heat medium flow path of a double-pipe heat exchanger.

The metal tube 10 constituting the fluid flow path 12 is cut, and an attachment 14A for the fluid characteristic measurement sensor is interposed between end portions of the cut metal tubes 10.

The attachment 14A includes a body 16A through which a body flow path 1606 extends and to which a temperature sensor 18 and a pressure sensor 20 are attached in advance and a pair of connection members 22 that connect the fluid flow paths 12 and the body flow path 1606.

In the first embodiment, joint fittings 24A are used as the pair of connection members 22.

As illustrated in FIG. 2(A) to FIG. 2(C), the body 16A is formed as a cube-shaped block.

Note that the body 16A may be formed of conventionally known various materials, such as a metal or a synthetic resin, but since the fluid flow path 12 is constituted by the metal tube 10, when the body 16A is also made of metal, it is advantageous in suppressing, for example, a variation in the temperature of the heat medium flowing through the fluid flow path 12 and accurately measuring the characteristics of the heat medium, and further it is more advantageous when the body 16A is made of the same metal material as the metal tube 10.

Additionally, the shape of the body 16A may be cylindrical or polyhedral, and is not limited to the cube.

The body flow path 1606 extending through the body 16A is formed to extend through at an inner diameter same as that of the fluid flow path 12, and both ends of the fluid flow path 12 in an extension direction are a pair of first opening portions 1608.

Note that the inner diameter of the body flow path 1606 need not be the same inner diameter as that of the fluid flow path 12 of the metal tube 10. However, when the body flow path 1606 is formed to have the same inner diameter as the fluid flow path 12, it is advantageous that, for example, a variation in pressure of the heat medium flowing through the fluid flow path 12 is suppressed and characteristics of the heat medium are accurately measured.

In the present embodiment, the body flow path 1606 is formed to extend through across a pair of end surfaces 1602, which are opposed to one another, of the body 16A, and the first opening portions 1608 of the body flow path 1606 are positioned in the respective pair of end surfaces 1602.

In the pair of end surfaces 1602, female threads 1609 having an inner diameter larger than the body flow path 1606 are formed coaxially with the body flow path 1606, and the first opening portion 1608 is formed in the inner space of the female thread 1609.

The temperature sensor 18 and the pressure sensor 20 are liquid-tightly and air-tightly attached to the body 16A such that sensor units of them are positioned in the body flow path 1606.

The temperature sensor 18 or the pressure sensor 20 is attached to the body 16A by inserting the temperature sensor 18 or the pressure sensor 20 from one side surface 1604 among the four side surfaces 1604 that connect the pair of end surfaces 1602 into an attachment hole 1610 formed to extend through the body flow path 1606 via a sealant (not illustrated).

The attachment holes 1610 are provided to be spaced apart in the extension direction of the body flow path 1606.

Note that when a plurality of fluid characteristics measurement sensors are provided, for example, they may be attached to the same side surface 1604 or may be attached to the different side surfaces 1604, which is arbitrary.

As illustrated in FIG. 1, the joint fitting 24A is made of metal and includes a male thread tube 2402 engaged with a female thread 1609, a nut portion 2406 provided on the end portion of the male thread tube 2402 integrally with the male thread tube 2402, and a union nut 2404 rotatably mounted to the male thread tube 2402.

The inner diameter of the male thread tube 2402 need not be same as the inner diameter of the fluid flow path 12 of the metal tube 10. However, the use of a joint fitting including the male thread tube 2402 having an inner diameter same as the fluid flow path 12 is advantageous in, for example, suppressing a variation in pressure of the heat medium flowing through the fluid flow path 12 and accurately measuring the characteristics of the heat medium.

The joint fitting 24A is attached to the body 16A by engaging the male thread tube 2402 to the female thread 1609 of the body 16A or is attached by joining the union nut 2404 to the male thread at the cut end portion of the metal tube 10. Thus, the body flow path 1606, the male thread tube 2402, and the metal tube 10 are coaxially connected.

Next, attachment of the attachment 14A for the fluid characteristic measurement sensor to the metal tube 10 is described.

First, the male thread tubes 2402 of the pair of joint fittings 24A are engaged to the female threads 1609 of the body 16A by rotating the nut portions 2406 to join the pair of joint fittings 24A to the body 16A.

Next, the portion of the metal tube 10 into which the attachment 14A for the fluid characteristic measurement sensor is interposed is cut, and male threads (not illustrated) are formed in the respective cut end portions of the pair of cut metal tubes 10 using a die (not illustrated).

The male threads in the respective cut end portions of the pair of metal tubes 10 are inserted into the insides of the union nuts 2404 of the respective joint fittings 24A, the union nuts 2404 are rotated, and the male threads in the cut end portions are engaged with female threads in the inner circumferential portions of the union nuts 2404 to join the cut end portions at the insides of the union nuts 2404.

Through the work, the attachment 14A for the fluid characteristic measurement sensor is interposed into the metal tube 10.

Although a commercially available product is used as the joint fitting 24A, the joint fitting 24A is not limited to the structure of the embodiment, and conventionally known various commercially available products, such as a coupler, a socket, and a nip, can be used.

According to the present embodiment, there is provided the body 16A through which the body flow path 1606 extends and to which the temperature sensor 18 and the pressure sensor 20 that detect the temperature and the pressure of the fluid flowing through the body flow path 1606 are attached in advance and the pair of connection members 22 that connect the fluid flow path 12 and the body flow path 1606 and the joint fittings 24A are used as the connection members 22.

Therefore, in measuring the characteristics of the double-pipe heat exchanger, simple works, such as the work of cutting the metal tube 10, the work of forming the male thread at the cutting end portion of the metal tube 10, the work of joining one end of the joint fitting 24A to each cut end portion of the metal tube 10, and a work of joining the other end of the joint fitting 24A to the body 16A, allow interposing the attachment 14A for the fluid characteristic measurement sensor into the metal tube 10, which is advantageous for the efficient measurement work.

Moreover, since the temperature sensor 18 and the pressure sensor 20 are attached to the body 16A in advance via the sealants, the heat medium does not leak from the portion of the body 16A to which the temperature sensor 18 or the pressure sensor 20 is attached, which is advantageous in accurately measuring the temperature or the pressure of the heat medium.

This eliminates redoing a sample creation work due to measurement error, which is advantageous for an efficient measurement work.

Conventionally, while 10.5 hours were required for the attachment work of the temperature sensor 18 and the pressure sensor 20 to the metal tube 10, the work requires 2.5 hours in the present embodiment, achieving shortening by 8 hours.

Additionally, the body 16A and the joint fitting 24A are made of the metal material similar to the metal tube 10, and thus a failure, such as a variation in the temperature of the heat medium at the portion of the body 16A or the joint fitting 24A, does not occur, and which is advantageous in accurately measuring the temperature and the pressure of the heat medium.

In this case, when the body 16A is made of the same metal material as the metal tube 10, it is advantageous in accurately measuring the temperature and the pressure of the heat medium.

Second Embodiment

Next, the second embodiment will be described with reference to FIGS. 3 to 5.

Note that, in the embodiments described below, the same portions and members as those of the first embodiment are denoted by the same reference signs and the description of these portions and members is omitted or simplified, with different portions focused on.

The second embodiment differs from the first embodiment in that a flange 26A is used instead of one joint fitting 24A of the pair of joint fittings 24A used as the connection members 22 and a joint fitting 24B having a structure different from the joint fitting 24A is used instead of the other joint fitting 24A of the pair of joint fittings 24A.

As illustrated in FIG. 4(A) to FIG. 4(D), similar to the first embodiment, a body 16B is made of the material same as the metal constituting the metal tube 10 and formed as a cube-shaped block.

The body flow path 1606 is formed to extend through the pair of end surfaces 1602 opposed to one another of the body 16B.

Similar to the first embodiment, the temperature sensor 18 and the pressure sensor 20 are liquid-tightly and air-tightly attached to the body 16B in advance such that sensor units of them are positioned in the body flow path 1606.

In one end surface 1602 among the pair of end surfaces 1602, a male thread tube 1611 through which the body flow path 1606 extends is disposed so as to project, and one opening portion 1620 among a pair of the opening portions 1620 of the body flow path 1606 is positioned at the end of this male thread tube 1611.

In the other end surface 1602 of the pair of end surfaces 1602, a large diameter portion 1612 having an inner diameter greater than that of the body flow path 1606 is provided coaxially with the body flow path 1606, and the inner side of the large diameter portion 1612 is the other opening portion 1620 among the pair of opening portions 1620.

The end surface 1602 of the body 16B in which the other first opening portion 1620 is positioned is formed as a first mating surface 1622 formed of a plane.

The female thread 1624 is provided at the portion of the first mating surface 1622 around the first opening portion 1620, and a plurality of the female threads 1624 are provided at regular intervals in a circumferential direction on a single circumference centered on the first opening portion 1620.

Figure 5A:
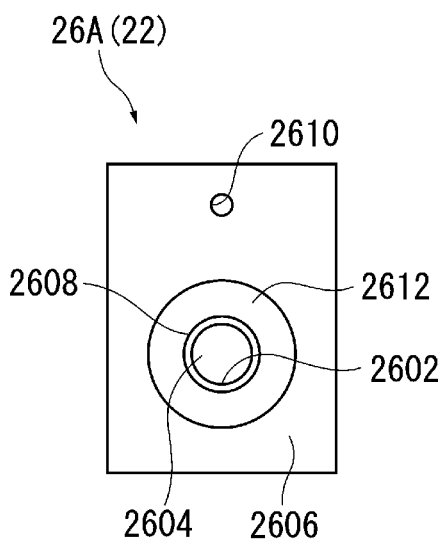
FIG. 5(A) and FIG. 5(B) are explanatory diagrams of a flange according to the second embodiment.
Figure 5B:
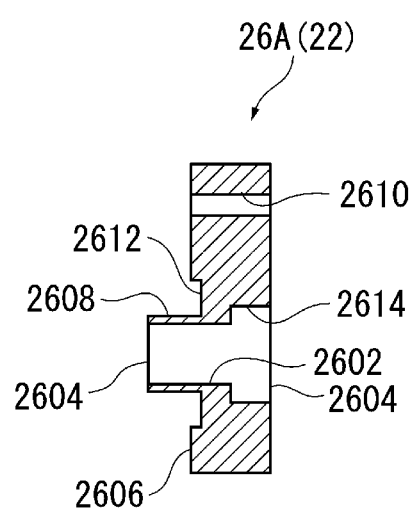

As illustrated in FIG. 5(A) and FIG. 5(B), the flange 26A has a rectangular parallelepiped plate shape, and is made of the same metal material as the body 16B.

A flange flow path 2602 extending through in the thickness direction of the flange 26A is formed on one side in the longitudinal direction of the flange 26A. Both ends in the extension direction of the flange flow path 2602 are second opening portions 2604 where the flange flow path 2602 is open, and a pair of the second opening portions 2604 are provided.

The portion of the flange 26A where one second opening portion 2604 among the pair of second opening portions 2604 is positioned is formed of a plane and formed as a second mating surface 2606 mated with the first mating surface 1622.

An insertion tube portion 2608 that protrudes from the portion of this second mating surface 2606 is provided at the portion of the second mating surface 2606 where the flange flow path 2602 is positioned.

The insertion tube portion 2608 is provided to be insertable into the body flow path 1606 from the large diameter portion 1612 and the first opening portion 1620.

Figure 3:
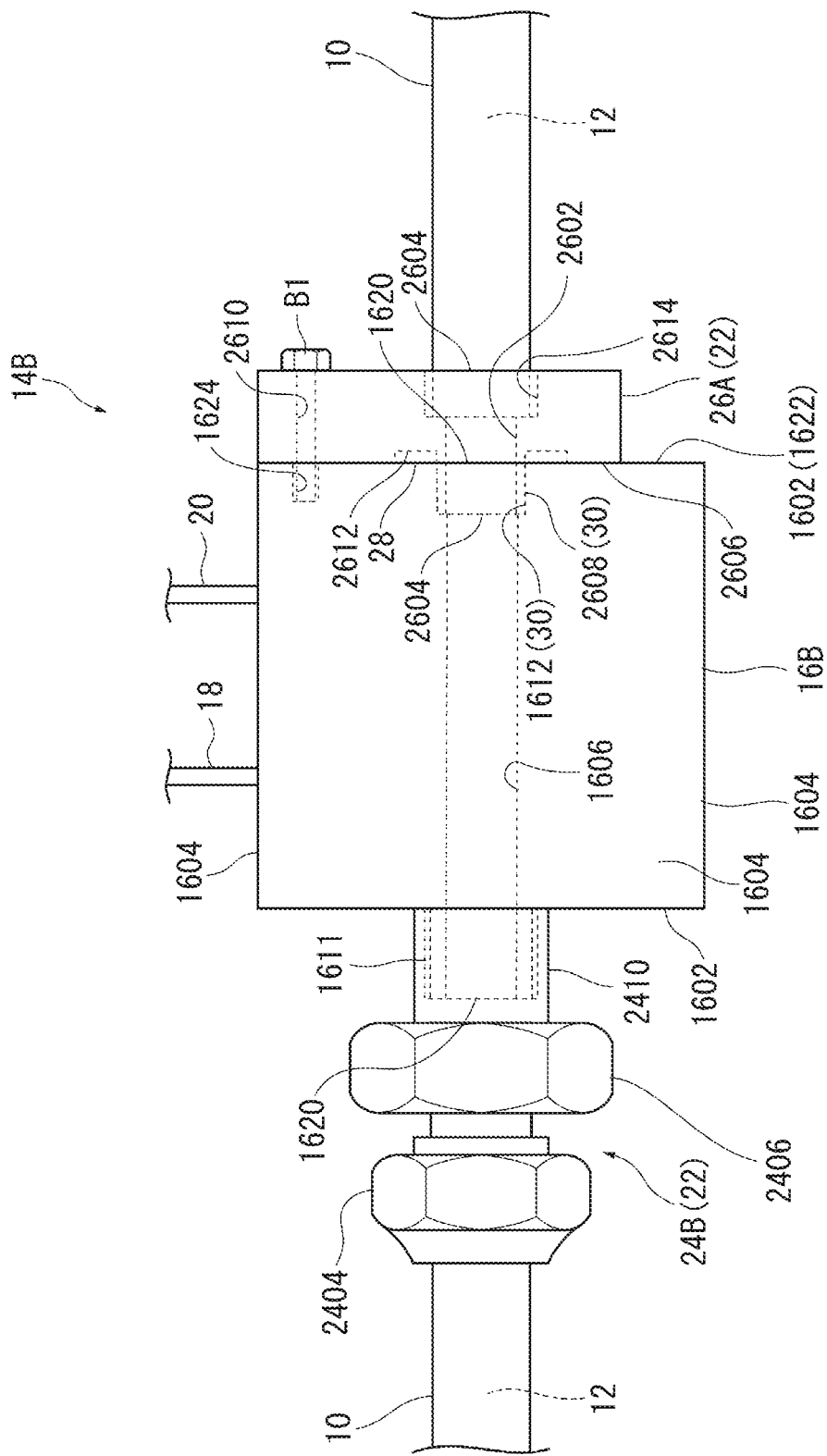
FIG. 3 is a front view of an attachment for a fluid characteristic measurement sensor according to a second embodiment interposed into a metal tube.
Figure 4B:
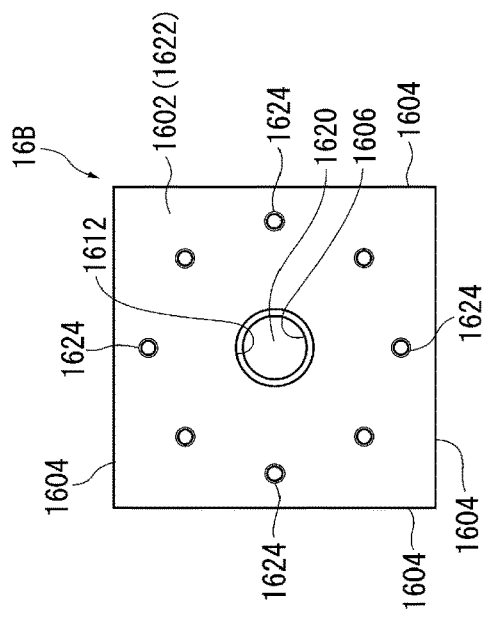
FIG. 4(A) to FIG. 4(D) are explanatory diagrams of a body according to the second embodiment.
Figure 4C:
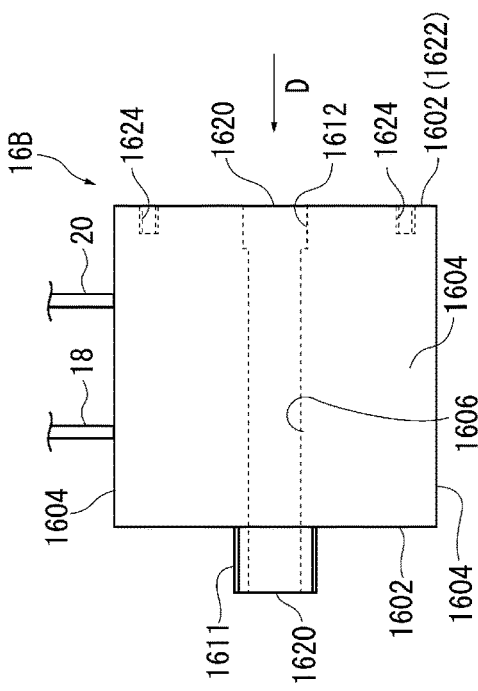
Figure 4A:
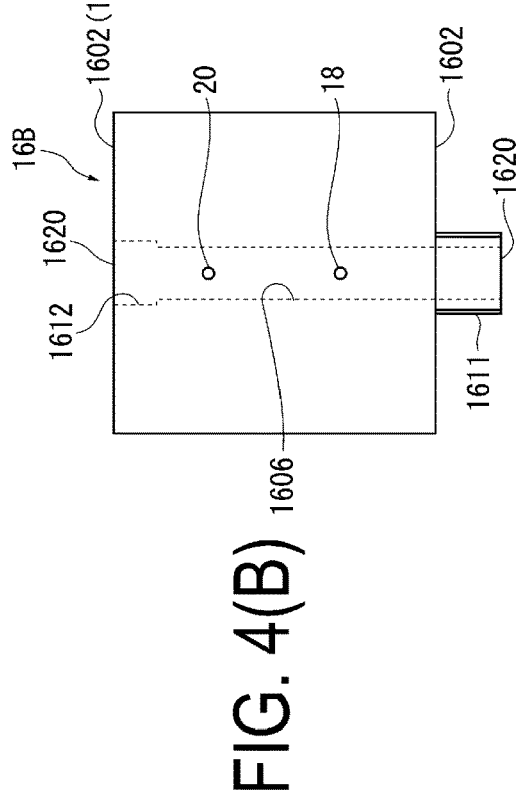
Figure 4D:
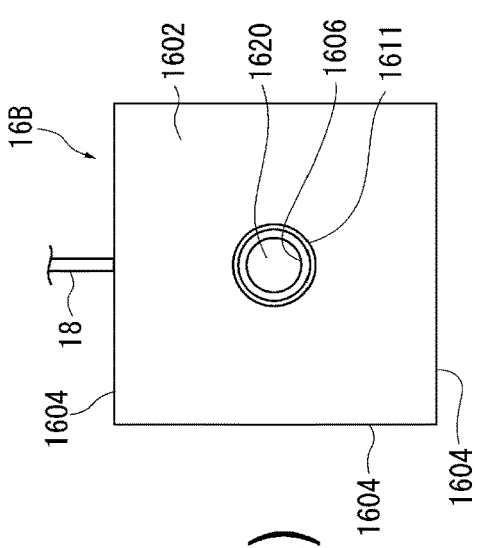

In the present embodiment, as illustrated in FIG. 3, a positioning portion 30 that coaxially positions the body flow path 1606 and the flange flow path 2602 with the first mating surface 1622 mated with the second mating surface 2606 is constituted by the insertion tube portion 2608 and the large diameter portion 1612. Note that the positioning portion 30 may be configured with a positioning pin or a positioning hole, but when configured as in the embodiment, since the insertion tube portion 2608 can also be used as a guide member for smoothly joining the flange 26A and the body 16B together, it is advantageous in simplifying the structure.

Also, with the insertion tube portion 2608 inserted into the body flow path 1606 from the large diameter portion 1612, a bolt insertion hole 2610 is formed to extend through at the portion of the flange 26A matching the female thread 1624 of the first mating surface 1622 of the body 16B.

Additionally, an annular recess portion 2612 is provided at a portion of the second mating surface 2606 positioned around the entire circumference of the insertion tube portion 2608.

As illustrated in FIG. 3, a sealing member 28 is disposed in the annular recess portion 2612.

The sealing member 28 is disposed between around the first opening portion 1620 and around the second opening portion 2604 to connect the body flow path 1606 and the flange flow path 2602 to be liquid-tight and air-tight.

Conventionally known various ones, such as a gasket and an O-ring, can be used as the sealing member 28.

Additionally, a brazing recess portion 2614 into which the end portion of the metal tube 10 is inserted coaxially with the flange flow path 2602 for brazing is provided at the portion on the end surface of the other second opening portion 2604 among the pair of second opening portions 2604.

The brazing recess portion 2614 is formed with an inner diameter larger than the inner diameter of the flange flow path 2602.

The joint fitting 24B is provided with a female thread tube 2410 engaged with the male thread tube 1611 of the body 16B, instead of the male thread tube 2402 of the joint fitting 24A according to the first embodiment.

An attachment 14B for the fluid characteristic measurement sensor is interposed into the metal tube 10 by rotating the nut portion 2406 to join the female thread tube 2410 of the joint fitting 24B to the male thread tube 1611 of the body 16B.

Next, the portion of the metal tube 10 into which the attachment 14B for the fluid characteristic measurement sensor is interposed is cut, and a male thread (not illustrated) is formed in the cut end portion of one metal tube 10 using a die (not illustrated).

Then, the male thread is inserted into the inside of the union nut 2404 of the joint fitting 24B, and the union nut 2404 is rotated to join one cut end portion at the inside of the union nut 2404.

Also, the cut end portion of the other metal tube 10 is inserted into the brazing recess portion 2614 of the flange 26A and attached to the inner circumferential surface of the brazing recess portion 2614 by brazing. Thus, among the pair of second opening portions 2604, the other second opening portion 2604 and the cut end portion of the other metal tube 10 are connected. Accordingly, in the present embodiment, the brazing recess portion 2614 and a brazing material that attaches the cut end portion of the metal tube 10 and the inner circumferential surface of the brazing recess portion 2614 constitute a joining portion that connects the portion of the flange 26A in which the other second opening portion 2604 is provided and the cut end portion of the other metal tube 10. That is, the cut end portion of the metal tube 10 is connected to the portion of the flange 26A in which the other second opening portion 2604 is provided via the joining portion.

When the cut end portion of the other metal tube 10 is attached to the brazing recess portion 2614, the sealing member 28 is disposed in the annular recess portion 2612, the insertion tube portion 2608 of the flange 26A is inserted into the body flow path 1606 from the first opening portion 1620 positioned in the first mating surface 1622 of the body 16B, and the second mating surface 2606 of the flange 26A is mated with the first mating surface 1622 of the body 16B.

A bolt B1 is then inserted from the bolt insertion hole 2610 to be engaged with the female thread 1624 to fasten the flange 26A to the body 16B.

Note that, for example, the flange 26A is attached to the body 16B prior to the joint fitting 24B, which is arbitrary.

Through the work, the attachment 14B for the fluid characteristic measurement sensor is interposed into the metal tube 10.

According to the present embodiment, there is provided the body 16B through which the body flow path 1606 extends and to which the temperature sensor 18 and the pressure sensor 20 that detect the temperature and the pressure of the fluid flowing through the body flow path 1606 are attached in advance and the pair of connection members 22 that connect the fluid flow path 12 and the body flow path 1606, and the flange 26A and the joint fitting 24B are used as the connection members 22.

Accordingly, the same effects as those of the first embodiment are also exhibited by the present embodiment.

That is, in measuring the characteristics of the double-pipe heat exchanger, simple works, such as the work of cutting the metal tube 10, the work of forming the male thread at one cutting end portion of the metal tube 10, the work of joining one end of the joint fitting 24B to the male thread formed in the cut end portion of the metal tube 10, a work of joining the other end of the joint fitting 24B to the body 16B, a work of brazing the other cut end portion of the metal tube 10 to the brazing recess portion 2614 of the flange 26A, a work of disposing the sealing member 28 in the annular recess portion 2612, a work of inserting the insertion tube portion 2608 of the flange 26A into the body flow path 1606 of the body 16B, and a work of fastening the bolt B1 inserted through the bolt insertion hole 2610 of the flange 26A to the female thread 1624 of the body 16B, allow interposing the attachment 14B for the fluid characteristic measurement sensor into the metal tube 10, which is advantageous for the efficient measurement work.

Moreover, since the temperature sensor 18 and the pressure sensor 20 are attached to the body 16B in advance via the sealants, the heat medium does not leak from the portion of the body 16B to which the temperature sensor 18 or the pressure sensor 20 is attached, which is advantageous in accurately measuring the temperature or the pressure of the heat medium.

This eliminates redoing a sample creation work due to measurement error, which is advantageous for an efficient measurement work, and provides the effects similar to those of the first embodiment.

In addition, even when the angle of the flange 26A in the circumferential direction of the metal tube 10 is slightly displaced during brazing the cut end portion of the other metal tube 10 to the brazing recess portion 2614, since the plurality of female threads 1624 are provided in the first mating surface 1622 of the body 16B, the displacement can be absorbed within a backlash of the bolt insertion hole 2610 of the flange 26A, which is advantageous for an efficient fastening work of the body 16B and the flange 26A.

Additionally, the body 16B, the flange 26A, and the joint fitting 24B are made of the metal material similar to the metal tube 10, and thus a failure, such as a variation in the temperature of the heat medium at the portion of the body 16B, the flange 26A, or the joint fitting 24B, does not occur, and which is advantageous in accurately measuring the temperature and the pressure of the heat medium.

In this case, when the body 16B and the flange 26A are made of the same metal material as the metal tube 10, it is advantageous in accurately measuring the temperature and the pressure of the heat medium.

Third Embodiment

Next, the third embodiment will be described with reference to FIGS. 6 to 8.

The third embodiment differs from the first embodiment in that as the connection members 22, a pair of flanges 26B having a structure slightly different from the flange 26A of the second embodiment are used.

Figure 6:
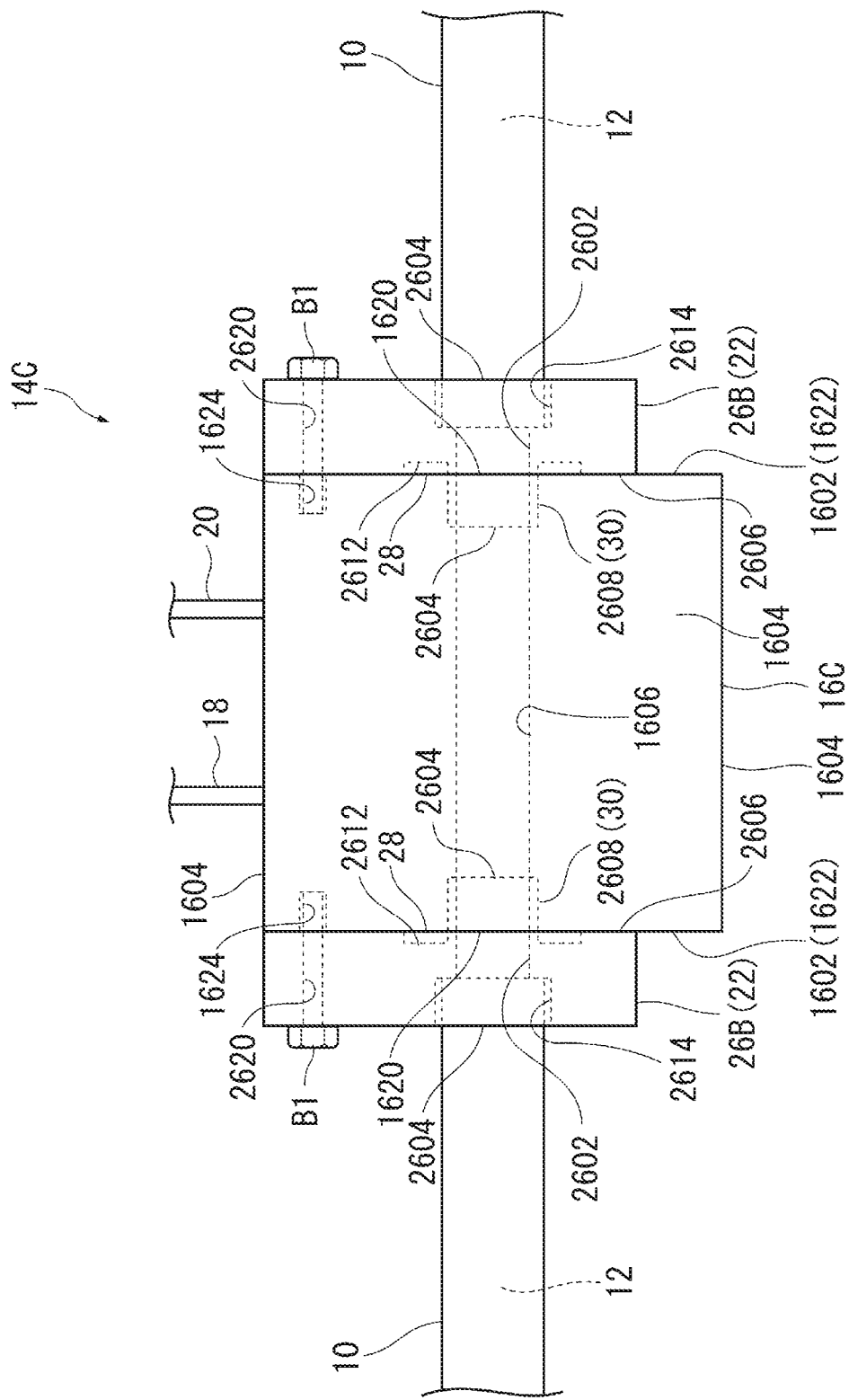
FIG. 6 is a front view of an attachment for a fluid characteristic measurement sensor according to a third embodiment interposed into a metal tube.

As illustrated in FIG. 6, an attachment 14C for the fluid characteristic measurement sensor according to the third embodiment includes a body 16C to which the temperature sensor 18 and the pressure sensor 20 are attached in advance and the pair of flanges 26B that connect the metal tube 10 to the body 16C.

As illustrated in FIG. 7(A) to FIG. 7(C), similar to the first embodiment, the body 16C is made of the same material as the metal constituting the metal tube 10 and formed as a cube-shaped block.

The body flow path 1606 is formed to extend through the body 16C, the temperature sensor 18 and the pressure sensor 20 are liquid-tightly and air-tightly attached to the body 16C such that sensor units of them are positioned in the body flow path 1606.

Both ends of the body flow path 1606 in the extension direction are formed as the large diameter portions 1612 having an inner diameter larger than the body flow path 1606, the respective first opening portions 1620 of the body flow path 1606 are positioned at the insides of the large diameter portions 1612 in the pair of end surfaces 1602 of the body 16C.

The pair of end surfaces 1602 are formed as planes as the first mating surfaces 1622 with respect to the pair of flanges 26B.

The female thread 1624 is provided at the portion of the first mating surface 1622 around the first opening portion 1620, and a plurality of the female threads 1624 are provided at regular intervals in a circumferential direction on a single circumference centered on the first opening portion 1620.

Figure 8A:
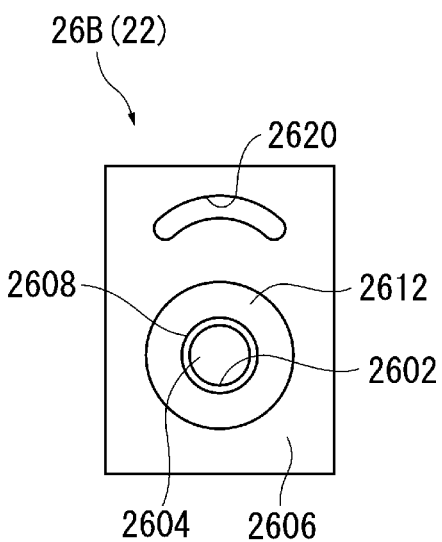
FIG. 8(A) and FIG. 8(B) are explanatory diagrams of a flange according to the third embodiment.
Figure 8B:
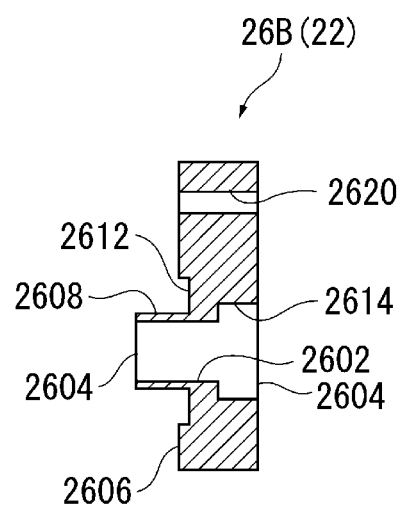

As illustrated in FIG. 8(A) and FIG. 8(B), in the flange 26B according to the third embodiment, a bolt insertion hole 2620 of the second embodiment is formed of a long hole in which at least the two adjacent female threads 1624 are positioned in a state where the insertion tube portion 2608 is inserted into the body flow path 1606 from the first opening portion 1620, and the other portion is similar to the flange 26A of the second embodiment.

To interpose the attachment 14C for the fluid characteristic measurement sensor into the metal tube 10, first, the portion of the metal tube 10 into which the attachment 14C for the fluid characteristic measurement sensor is interposed is cut.

Next, the cut end portions of the pair of metal tubes 10 are inserted into the brazing recess portions 2614 of the respective flanges 26B and attached to the inner circumferential surfaces of the brazing recess portions 2614 by brazing. This connects the pair of second opening portions 2604 and the cut end portions of the pair of metal tubes 10. Thus, similarly to the second embodiment, the brazing recess portions 2614 and the brazing material constitute the joining portion. The cut end portion of the metal tube 10 is connected to the portion of the flange 26B in which the other second opening portion 2604 is provided via the joining portion.

When the cut end portion of the metal tube 10 is attached to the brazing recess portion 2614, the sealing member 28 is disposed in the annular recess portion 2612, the insertion tube portion 2608 of the flange 26B is inserted into the body flow path 1606 from the first opening portion 1620 in the first mating surface 1622 of the body 16C, and the second mating surface 2606 of the flange 26B is mated with the first mating surface 1622 of the body 16C.

The bolt B1 is then inserted from the bolt insertion hole 2620 to be engaged with the female thread 1624 to fasten the flange 26B to the body 16C.

Through the work, the attachment 14C for the fluid characteristic measurement sensor can interposed into the metal tube 10, which is advantageous for the efficient measurement work.

The third embodiment also provides the effects similar to those of the first and second embodiments. Additionally, the bolt insertion hole 2620 of the flange 26B is formed of the long hole in which at least the two adjacent female threads 1624 are positioned. Accordingly, during brazing of the cut end portion of the metal tube 10 to the brazing recess portion 2614, brazing can be performed without considering the angle of the flange 26B in the circumferential direction of the metal tube 10, and an effect that is further advantageous in the efficient fastening work of the body 16C and the flange 26B is provided.

Next, with reference to FIG. 9, FIG. 10(A), and FIG. 10(B), a modified example of the flanges 26A, 26B constituting the connection members 22 will be described.

A flange 26C according to the modified example differs from the flanges 26A, 26B according to the second and third embodiments in a configuration of a joining portion that connects a portion of the flange 26C in which the other second opening portion 2604 is provided and the cut end portion of the metal tube 10.

Figure 9:
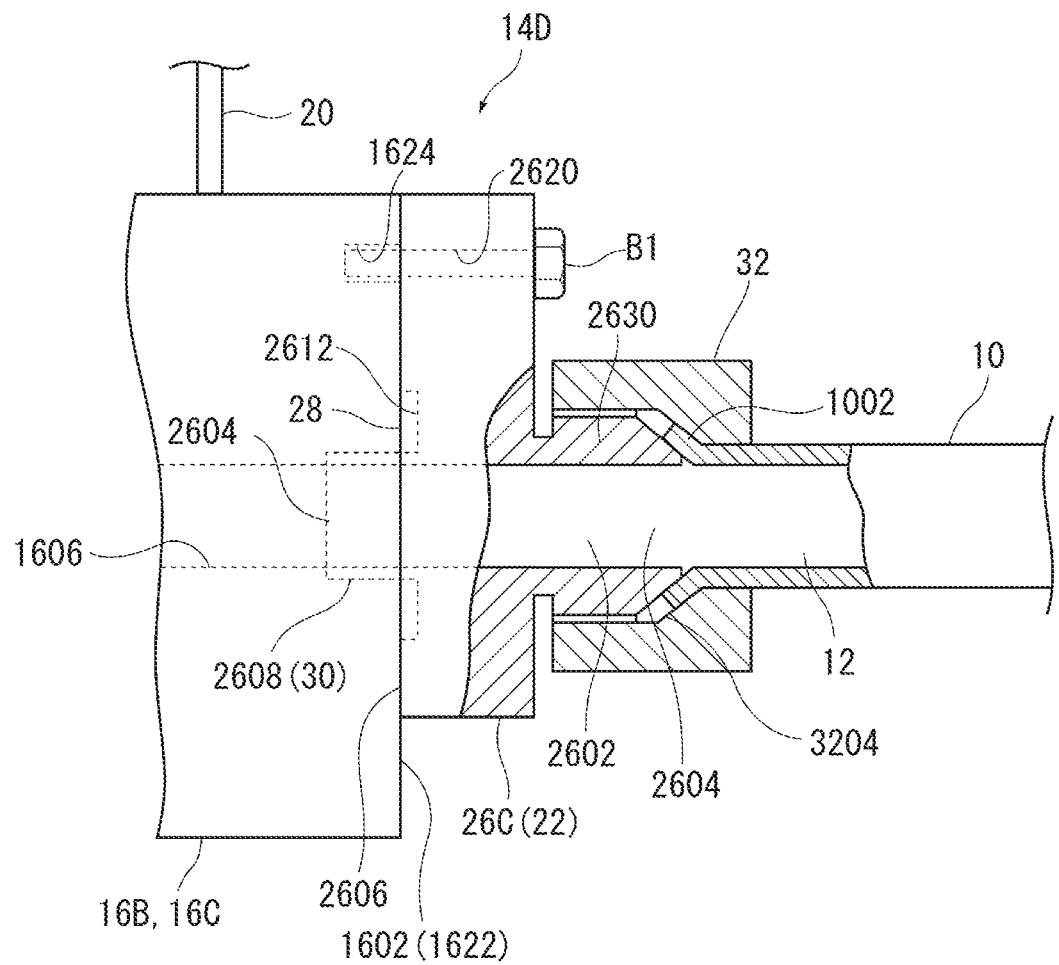
FIG. 9 is a main portion cross-sectional view of a state in which a flange according to a modified example is attached to the body.

As illustrated in FIG. 9, the structure of attaching the flange 26C according to the modified example to the body 16B, 16C (see FIGS. 3 and 6) is the same as that of the second or third embodiment.

Figure 10A:
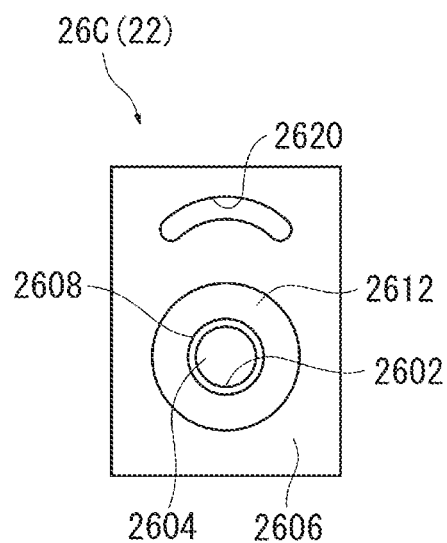
FIG. 10(A) and FIG. 10(B) are explanatory diagrams of the flange according to the modified example.
Figure 10B:
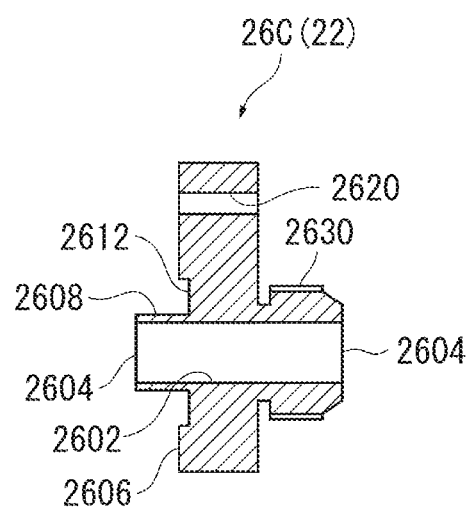

Therefore, as illustrated in FIG. 10(A) and FIG. 10(B), similarly to the flanges 26A, 26B, the flange 26C according to the modified example includes the flange flow path 2602, the pair of second opening portions 2604, the second mating surface 2606, the insertion tube portion 2608, the annular recess portion 2612, and the bolt insertion hole 2620. The sealing member 28 (see FIG. 9) is disposed in the annular recess portion 2612.

Similarly to the flanges 26A, 26B, the flange 26C according to the modified example is attached to the body 16B, 16C by inserting the bolt B1 from the bolt insertion hole 2620, engaging the bolt B1 with the female thread 1624, and fastening the flange 26C to the body 16B, 16C.

As illustrated in FIG. 10(B), in the flange 26C according to the modified example, the brazing recess portion 2614 for brazing the cut end portion of the metal tube 10 is not provided, and a male thread tube 2630 is disposed so as to project instead of the brazing recess portion 2614.

That is, in the flange 26C according to the modified example, the male thread tube 2630 is disposed so as to project coaxially with the flange flow path 2602 on the surface opposed to the second mating surface 2606, the flange flow path 2602 is formed to extend through the inside of the male thread tube 2630, and the other second opening portion 2604 among the pair of second opening portions 2604 is positioned in the end portion of the male thread tube 2630.

The cut end portion of the metal tube 10 and the flange 26C are joined via the male thread tube 2630 and a piping nut 32.

Figure 11A:
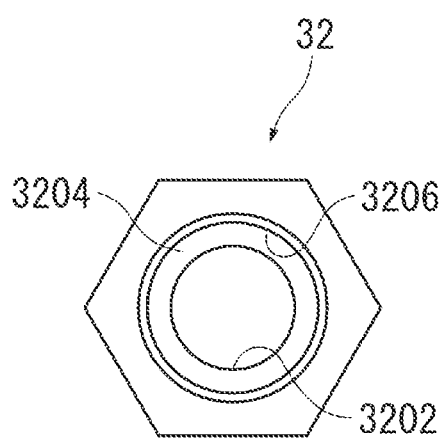
FIG. 11(A) and FIG. 11(B) are explanatory diagrams of a piping nut.
Figure 11B:
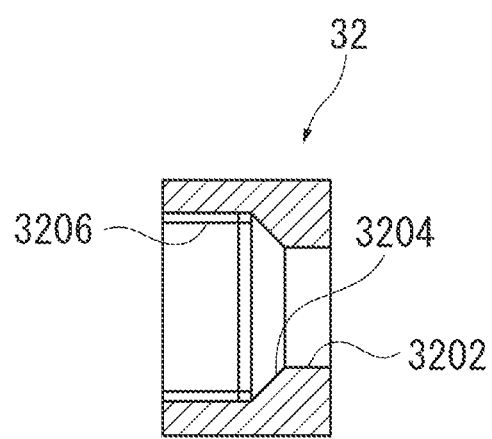

As illustrated in FIG. 11(A) and FIG. 11(B), a metal tube insertion hole 3202 into/from which the cut end portion of the metal tube 10 is insertable/removable, a tapered portion 3204 having a conical surface shape continuous with the metal tube insertion hole 3202 and gradually increasing the inner diameter, and a female thread portion 3206 continuous with the tapered portion 3204 are provided inside the piping nut 32.

The cut end portion of the metal tube 10 is joined to the flange 26C together by inserting the cut end portion of the metal tube 10 into the piping nut 32 from the metal tube insertion hole 3202. After the insertion, as illustrated in FIG. 9, an expanded-diameter portion 1002 whose diameter is expanded by a tool is manufactured on the cut end portion of the metal tube 10.

After the expanded-diameter portion 1002 is manufactured on the cut end portion of the metal tube 10, the expanded-diameter portion 1002 is caused to pass through the female thread portion 3206 to abut on the tapered portion 3204. The piping nut 32 is rotated to engage the female thread portion 3206 of the piping nut 32 with the male thread of the male thread tube 2630 to fasten, and the expanded-diameter portion 1002 is sandwiched between the tapered portion 3204 and the distal end of the male thread tube 2630 for fixation.

This joins the cut end portion of the metal tube 10 and the flange 26C together. Therefore, in the present embodiment, the male thread tube 2630 and the piping nut 32 constitute the joining portion that connects the portion of the flange 26C in which the other second opening portion 2604 is provided and the cut end portion of the metal tube 10. That is, the cut end portion of the metal tube 10 is connected to the portion of the flange 26C in which the other second opening portion 2604 is provided via the joining portion.

An attachment 14D of the fluid characteristic measurement sensor using the flange 26C according to the modified example allows reliable and easy interposing of the attachment 14D of the fluid characteristic measurement sensor to the metal tube 10, which is advantageous for an efficient measurement work.

Note that in the present embodiment, the case in which the fluid flowing through the fluid flow path 12 is the heat medium flowing through the fluid flow path of the double-pipe heat exchanger has been described, but the fluid is not limited to the heat medium, and the measurement is widely applied to fluid characteristics of the fluid flowing through fluid flow paths of various devices.

REFERENCE SIGNS LIST

10 Metal tube
1002 Expanded-diameter portion
12 Fluid flow path
14A, 14B, 14C, 14D Attachment of fluid characteristic measurement sensor
16A, 16B, 16C Body
1602 A pair of end surfaces
1604 Side surface
1606 Body flow path
1608, 1620 First opening portion
1609 Female thread
1610 Attachment hole
1611 Male thread tube
1612 Large diameter portion
1620 First opening portion
1622 First mating surface
1624 Female thread
18 Temperature sensor
20 Pressure sensor
22 Connection member
24A, 24B Joint fitting
2402 Male thread tube
2404 Union nut
2406 Nut portion
2410 Female thread tube
26A, 26B, 26C Flange
2602 Flange flow path
2604 Second opening portion
2606 Second mating surface
2608 Insertion tube portion
2610 Bolt insertion hole
2612 Annular recess portion
2614 Brazing recess portion
2620 Bolt insertion hole
2630 Male thread tube
28 Sealing member
30 Positioning portion
32 Piping nut
3202 Metal tube insertion hole
3204 Tapered portion
3206 Female thread portion
B1 Bolt

The invention claimed is:

1. An attachment for a fluid characteristic measurement sensor interposed between end portions of cut metal tubes formed by cutting the metal tube constituting a fluid flow path, the attachment comprising:
 a body having a pair of first opening portions through which a body flow path extends and the body flow path opens, at least one sensor that measures a characteristic of a fluid flowing through the body flow path being attached in advance to the body via sealant; and
 a pair of connection members attached to respective portions of the body where the pair of first opening portions are positioned, the pair of connection members being joined to the end portions of the metal tubes to connect the fluid flow path and the body flow path, the pair of connection members are flanges having a pair of second opening portions through which a flange flow path extends and the flange flow path opens; and
 a positioning portion that coaxially positions the body flow path and the flange flow path on the body and the flange,
 wherein the positioning portion comprises a large diameter portion and an insertion tube portion, the large diameter portion is disposed in an end portion of the body flow path and has an inner diameter larger than an inner diameter of the body flow path, the first opening portion is positioned in an inside of the large diameter portion such that the body flow path extending through the body is formed to extend through at an inner diameter same as that of the fluid flow path, the insertion tube portion is disposed to project from the flange and insertable into the large diameter portion, and the flange flow path extends through the insertion tube portion, and wherein the body, which is separate from the metal tube, is formed as one of a cube-shaped block, a cylindrical block and a polyhedral block.

2. An attachment for a fluid characteristic measurement sensor interposed between end portions of cut metal tubes formed by cutting the metal tube constituting a fluid flow path, the attachment comprising:

a body having a pair of first opening portions through which a body flow path extends and the body flow path opens, a plurality of sensors that measures characteristics of a fluid flowing through the body flow path being attached to the body, the body further having a plurality of attachment holes formed therein for accommodating the plurality of sensors which are attached to the body in advance via sealants, the attachment holes being provided to be spaced apart in an extension direction of the body flow path; and a pair of connection members attached to respective portions of the body where the pair of first opening portions are positioned, the pair of connection members being joined to the end portions of the metal tubes to connect the fluid flow path and the body flow path, the body flow path extending through the body is formed to extend through at an inner diameter same as that of the fluid flow path;

wherein the pair of connection members are joint fittings joined to the end portions of the metal tubes;

wherein the plurality of sensors are positioned in the body flow path; and wherein the body, which is separate from the metal tube, is formed as one of a cube-shaped block, a cylindrical block and a polyhedral block.

3. The attachment for the fluid characteristic measurement sensor according to claim 1, wherein a sealing member that connects the body flow path and the flange flow path to be liquid-tight and air-tight via the first opening portion and the second opening portion between around the first opening portion and around one second opening portion among the pair of second opening portions is provided, and the end portion of the metal tube is connected to a portion of the flange in which the other second opening portion among the pair of second opening portions is provided via a joining portion.

4. An attachment for a fluid characteristic measurement sensor interposed between end portions of cut metal tubes formed by cutting the metal tube constituting a fluid flow path, the attachment comprising:

a body having a pair of first opening portions through which a body flow path extends and the body flow path opens, at least one sensor that measures a characteristic of a fluid flowing through the body flow path being attached in advance to the body via sealant; and a pair of connection members attached to respective portions of the body where the pair of first opening portions are positioned, the pair of connection members being joined to the end portions of the metal tubes to connect the fluid flow path and the body flow path, wherein one connection member among the pair of connection members is a joint fitting joined to the end portion of the metal tube, the other connection member among the pair of connection members is a flange through which a flange flow path having an inner diameter same as an inner diameter of the fluid flow path extends, and the flange has a pair of second opening portions through which the flange flow path opens, a positioning portion that coaxially positions the body flow path and the flange flow path on the body and the flange is provided, the positioning portion comprising a large diameter portion and an insertion tube portion, the large diameter portion is disposed in an end portion of the body flow path and has an inner diameter larger than an inner diameter of the body flow path, the first opening portion is positioned in an inside of the large diameter portion such that the body flow path extending through the body is formed to extend through at an inner diameter same as that of the fluid flow path, the insertion tube portion is disposed to project from the flange and insertable into the large diameter portion, and the flange flow path extends through the insertion tube portion, a sealing member that connects the body flow path and the flange flow path to be liquid-tight and air-tight via the first opening portion and the second opening portion between around the first opening portion and around one second opening portion among the pair of second opening portions is provided, and the end portion of the metal tube is connected to a portion of the flange in which the other second opening portion among the pair of second opening portions is provided via a joining portion.

5. The attachment for the fluid characteristic measurement sensor according to claim 3, wherein a portion of the body around the first opening portion to which the flange is attached is formed as a first mating surface, a portion of the flange attached to the body is formed as a second mating surface mated with the first mating surface, a female thread is provided on the first mating surface, a bolt insertion hole is formed to extend through a portion of the flange matched with the female thread with the body flow path and the flange flow path coaxially positioned, a bolt is inserted into the bolt insertion hole and engaged with the female thread to attach the flange to the body, and a plurality of the female threads are provided at regular intervals in the first mating surface on a single circumference centered on the first opening portion.

6. The attachment for the fluid characteristic measurement sensor according to claim 4, wherein a portion of the body around the first opening portion to which the flange is attached is formed as a first mating surface, a portion of the flange attached to the body is formed as a second mating surface mated with the first mating surface, a female thread is provided on the first mating surface, a bolt insertion hole is formed to extend through a portion of the flange matched with the female thread with the body flow path and the flange flow path coaxially positioned, a bolt is inserted into the bolt insertion hole and engaged with the female thread to attach the flange to the body, and a plurality of the female threads are provided at regular intervals in the first mating surface on a single circumference centered on the first opening portion.

7. The attachment for the fluid characteristic measurement sensor according to claim 5, wherein the bolt insertion hole is formed of a long hole extending along a circumferential direction of the flange flow path.

8. The attachment for the fluid characteristic measurement sensor according to claim 6, wherein the bolt insertion hole is formed of a long hole extending along a circumferential direction of the flange flow path.

9. The attachment for the fluid characteristic measurement sensor according to claim 1, wherein the body is made of a metal material.

10. The attachment for the fluid characteristic measurement sensor according to claim 2, wherein the body is made of a metal material.

11. The attachment for the fluid characteristic measurement sensor according to claim 3, wherein the body and the flange are made of a metal material.

* * * * *